United States Patent [19]

Suib et al.

[11] Patent Number: 5,015,349
[45] Date of Patent: May 14, 1991

[54] LOW POWER DENSITY MICROWAVE DISCHARGE PLASMA EXCITATION ENERGY INDUCED CHEMICAL REACTIONS

[75] Inventors: Steven L. Suib, Storrs, Conn.; Zongchao Zhang, Evanston, Ill.

[73] Assignee: University of Connecticut, Storrs, Conn.

[21] Appl. No.: 454,305

[22] Filed: Dec. 21, 1989

Related U.S. Application Data

[63] Continuation-in-part of Ser. No. 289,320, Dec. 23, 1988, abandoned.

[51] Int. Cl.[5] .................... C10G 15/00; C10G 11/02
[52] U.S. Cl. .................................. 204/168; 204/172; 204/157.15; 208/106; 208/107; 208/113; 208/121; 208/122; 208/124; 585/648; 585/651; 585/653; 585/834; 585/860; 585/953
[58] Field of Search .......... 204/168, 172, 170, 157.15; 208/106, 107, 113, 121, 122, 124; 585/648, 651, 653, 659, 834, 860, 953

[56] References Cited

U.S. PATENT DOCUMENTS

| | | | |
|---|---|---|---|
| 3,663,394 | 5/1972 | Kawahara | 204/168 |
| 4,318,178 | 3/1982 | Stewart et al. | 585/650 |
| 4,376,225 | 3/1983 | Vora | 585/659 |
| 4,574,038 | 3/1986 | Wan | 204/157.15 |

Primary Examiner—T. Tung
Assistant Examiner—David G. Ryser
Attorney, Agent, or Firm—The M. W. Kellogg Company

[57] ABSTRACT

Disclosed is a method for cracking a hydrocarbon material. The method includes introducing a stream including a hydrocarbon fluid into a reaction zone. A microwave discharge plasma is continuously maintained within the reaction zone, and in the presence of the hydrocarbon fluid. Reaction products of the microwave discharge are collected downstream of the reaction zone.

15 Claims, 3 Drawing Sheets

LOW POWER DENSITY MICROWAVE DISCHARGE PLASMA EXCITATION ENERGY INDUCED CHEMICAL REACTIONS

RELATED APPLICATION DATA

This application is a continuation-in-part of U.S. application Ser. Number 289,370, filed Dec. 23, 1988 now abandoned.

FIELD OF THE INVENTION

The present invention relates to a method for making high energy hydrocarbon products using chemical reactions that are induced by excitation energy derived from a low power plasma. Also disclosed herein is a method for cracking hydrocarbon materials using a low-power plasma and a catalyst.

BACKGROUND OF THE INVENTION

A plasma containing ionized gases can be created by accelerating randomly occurring free electrons in an electric field until they attain sufficient energy to cause ionization of some of the gas molecules. Electrons formed in this ionization are in turn accelerated and produce further ionization. This progressive effect causes extensive breakdown of the gas accompanied by a rising level of electric current, and establishment of a discharge. This condition is often referred to as a discharge plasma. When sufficient energy has been applied, a steady state may be attained. At steady state there is an equilibrium between the rate of ion formation and the rate of recombination of the ions.

The electrical conductivity associated with discharge plasmas is caused by the drift of electrons in the electric field. Protons are also present in the plasma, but do not have a significant effect on the electric field because of their low drift velocity.

In addition to ionization, radical formation also occurs in a discharge plasma containing molecules consisting of two or more atoms. Radical formation is most often caused by the removal of one or more atoms from a molecule.

Plasma chemistry is the study of reactions of the species found in plasmas, i.e., atoms, free radicals, ions and electrons. The principles of plasma chemistry have been applied in such diverse areas as: chemical vapor deposition; substrate oxidation and anodization (such as formation of magnetic recording tape); and high temperature, high energy, plasma conversion of methane to acetylene (e.g. the Dupont arc acetylene process).

High energy hydrocarbon feedstocks such as ethylene and acetylene are vital to the petrochemical industry. However, these feedstocks are not found naturally in great abundance. One of the most prevalent hydrocarbon sources is natural gas. Natural gas contains over 90% methane, thermodynamically the most stable hydrocarbon. The energy needed to break one of the four C-H bonds of methane is about 415 kJ/mol.

Conversion of methane to other hydrocarbons to provide useful feedstocks is desirable, yet difficult due to the highly endothermic nature of the requisite conversion reaction. Typically, such conversion reactions have relied on high temperature reaction conditions. However, high temperature reactions are hard to control, and under such conditions it is difficult to prevent formation of unwanted by-products.

Industrial scale hydrocarbon cracking processes using plasma technology require extensive amounts of power in the form of electricity. For example, the Dupont acetylene process mentioned above, uses a plasma jet with a temperature of over 4000 K. This high temperature plasma jet is created by passing an electric current through a gaseous medium. The large amounts of electricity needed to create a high temperature plasma jet, and the poor selectivity (i.e., controllability) of the reaction and reaction products using such high temperature processes provide an incentive for the development of lower temperature reactions.

Other thermal techniques that have been employed to "crack" methane to form useful feedstocks include low and high frequency electrode and electrodeless discharge, triboelectric discharge, and laser irradiation. However, there are problems associated with each of these techniques, which make them unsuitable or impractical for large scale application. Electrical discharge results in coating of reactant on the electrode; triboelectric discharge involves potentially dangerous pressure changes, and is difficult to scale up. Laser irradiation is expensive and potentially corrosive to the reaction chamber.

Another technique which has been used in the search for an efficient cracking process for methane is microwave discharge. Microwave plasmas are created in the same manner as high temperature plasmas, although different microwave frequencies and less electric power is required to establish a plasma.

Several investigators have explored the use of plasmas in chemical reactions. McCarthy, J. Chem. Phys., 22:1360 (1954), obtained an energy yield of approximately 3600 kJ for each mole of $C_2$ hydrocarbon produced using microwave discharge. McCarthy employed a pulsed microwave source at an output power level of 1500 watts.

One example of a relatively high efficiency reaction, not involving a plasma, is described in U.S. Pat. No. 4,574,038 to Wan, issued Mar. 4, 1986. Wan discloses a microwave-induced catalytic hydrocracking process for the selective conversion of methane to ethylene and hydrogen.

The method disclosed by Wan involves exposing methane and a microwave-absorbing catalyst to microwave energy, with pulsed microwave energy sufficient to convert the methane to ethylene and hydrogen. According to Wan, in order for the reaction to proceed with viable speed and selectivity, it is important that the catalyst be capable of attaining temperatures of 1400° to 1600° F.

In one example, Wan placed a Ni-Fe (85-15%) powder catalyst (0.1 g) in a reaction cell. The catalyst was pretreated with a stream of hydrogen and high power microwave radiation to remove oxide from the metal powder surface. Methane was then introduced to the reaction cell at a pressure of one atmosphere of methane. Wan applied a microwave energy source of 2.4 GHz at 100 watt incident power level to the gas stream. The microwave generator was operated to provide 5 second "on-time" pulses for a cumulative duration of 20 seconds irradiation with off-time rests of 20-60 seconds. By this technique, Wan obtained yields of 51.3% ethylene, 26.7% hydrogen and 21.8% methane. With other catalysts Wan obtained ethylene at 16% yield (Ni catalyst) and 14.6% (Co catalyst).

A major disadvantage of the Wan process, and other high power cracking processes, is that a heavy coke residue is deposited on the walls of the reactor and/or on the catalyst that is employed to accelerate the reaction. To maintain the reactor in operation the microwave induced reaction must frequently be discontinued and the residue removed. Hence, the reactor is frequently out of service. In Wan for example, the reactor is scrubbed with hydrogen gas to remove oxides which have contaminated the catalyst. In addition, the Wan process does not use a plasma, and the process entails pulsing the microwave power on and off. As a result, the Wan process is relatively inefficient. The catalyst must be scrubbed periodically, requiring a hydrogen stream and additional energy. In addition, the cracking reaction is stopped while the catalyst is scrubbed. Therefore, the Wan method does not offer continuous production of a desired reaction product.

By virtue of its widespread availability and low cost, methane is a desirable raw material for use in producing high energy hydrocarbon feedstocks. In addition to simple high energy hydrocarbon feedstocks such as ethylene, acetylene, propane, propylene, butane and butene, it is also desirable to produce oxygenated hydrocarbon feedstocks such as formaldehyde and methanol from methane. Thermal, non-plasma techniques can be used to oxidize methane at high temperatures (e.g., 300°–700° C.). However, this technique affords relatively low selectivity in terms of creating chemical bonds, and rupturing existing bonds in the raw starting material. Various catalysts such as metal oxides, non-metal oxides and mixed oxides have been used in these reactions. These catalysts include: MgO, Li-doped MgO, $La_2O_3$, and mixtures of NaCl and $MnO_2$. The yields observed with these catalysts range from about 0.1% to 30%.

It has been shown that discharge plasma processes involving methane gas as a reactant can produce radicals of H, $CH_3$, $CH_2$, and CH in the gas phase. When oxygen alone is used as the reactant, several radical species are obtained, including O, $O_2^+$ and others. Previous attempts to create a plasma from a mixture of hydrocarbons and oxygen using a glow discharge arrangement, resulted in the formation of completely oxidized hydrocarbon, i.e, $CO_2$. Water and polymer deposits are also formed on the walls of the reactor. Nonetheless, oxygen-rich plasmas have been used commercially in adhesion processes and for selectively activating aromatic species.

Although microwave radiation has been used to crack methane, large quantities of power have conventionally been required to accomplish this objective, and substantial heat is evolved during the cracking process. Thus, the cost of electricity used to create the microwave radiation is a major factor in the low cost efficiency of feedstocks produced according to conventional microwave radiation plasma methods. In addition, the use of high power microwave radiation can rapidly foul catalysts used in the cracking process, resulting in additional loss of efficiency.

OBJECTS OF THE INVENTION

It is an object of the present invention to provide an efficient, selective and economical process for cracking small chain, low energy hydrocarbons in order to create high energy hydrocarbons useful as industrial feedstocks.

It is an additional object of the present invention to provide an efficient, selective and economical process for cracking small chain, low energy hydrocarbons in the presence of oxygen in order to create high energy oxygenated hydrocarbons useful as industrial feedstocks.

A still further object of the present invention is to provide a system for use in producing substituted and unsubstituted high energy hydrocarbons from low energy hydrocarbons.

SUMMARY OF THE INVENTION

The present invention is directed to a method for cracking a hydrocarbon material. The method includes introducing a stream including a hydrocarbon fluid and optionally a carrier fluid into a reaction zone. A microwave discharge plasma is continuously maintained within the reaction zone, and in the presence of the hydrocarbon fluid and the optional carrier fluid. Reaction products of the microwave discharge are collected downstream of the reaction zone.

DETAILED DESCRIPTION OF THE INVENTION

It has now been discovered that extremely low power microwave energy levels can be used in a continuous process for the conversion of short chain hydrocarbons to useful feedstocks. The low energy microwave radiation maintains a plasma of a primary reaction material such as methane gas alone or a gas stream of a mixture of the primary reactant and another reactant such as oxygen within a reaction zone. The present process is capable of converting almost 100% of the primary reactant to a high energy hydrocarbon. This is particularly surprising because the conversion is accomplished by using 25 to 1000 times less energy than prior art microwave processes.

Figure 1:
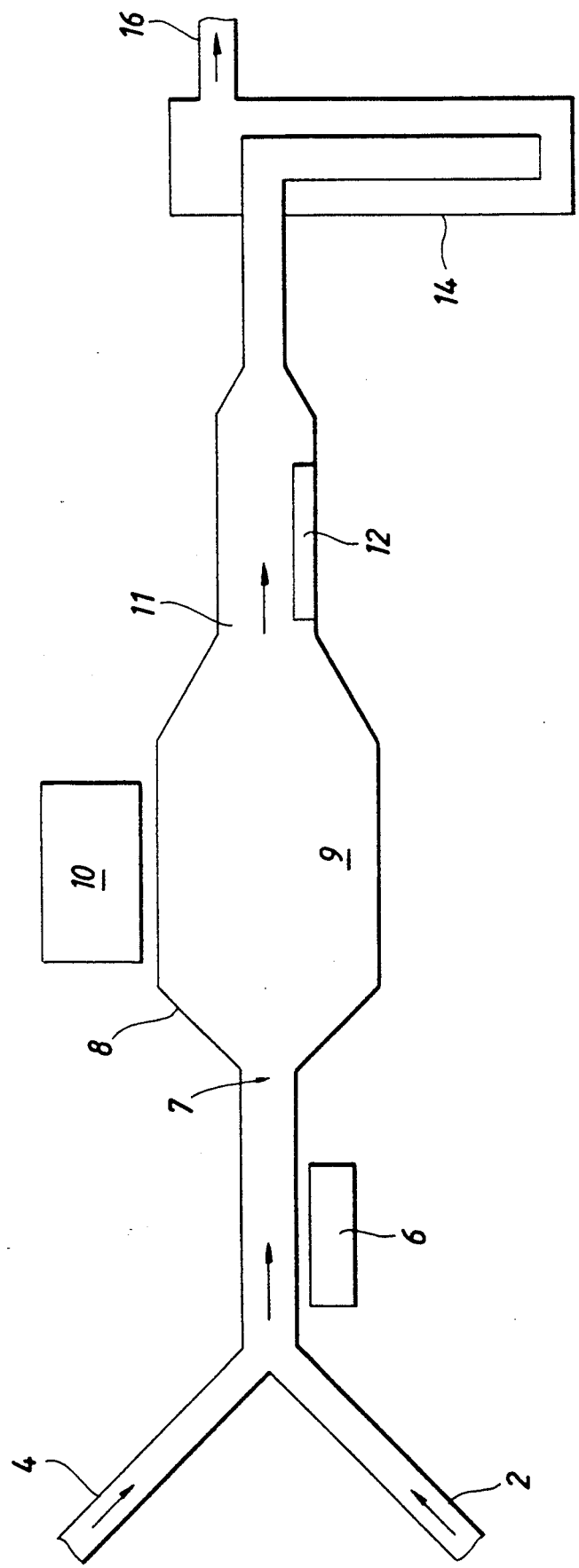

While not wishing to be bound by any particular theory of operation, it is believed that the conversion system of the present invention requires substantially less energy because almost all of the low power microwave energy emitted into the reaction zone is utilized to selectively break the bonds of the hydrocarbon reactant. For example, if methane is used as the reactant, almost all of the energy is used to break the C-H bonds of the methane molecule, and to activate (by exciting or breaking) bonds of the carrier fluid molecules. The Process FIG. 1 shows a schematic diagram of the process of the present invention.

According to a preferred process of the present invention, a hydrocarbon fluid reactant 2 to be cracked is provided. The hydrocarbon is mixed with a carrier fluid 4. The carrier primarily serves to dilute the hydrocarbon fluid, and may be either inert or reactive. The hydrocarbon fluid mixed with the carrier may then be heated, cooled, photolyzed or preirradiated at 6. The hydrocarbon fluid and carrier is then introduced at a predetermined flow rate through an inlet orifice 7 to a reactor 8 having a reaction zone 9, at a predetermined flow rate.

The reactor may be either a separate vessel or simply a segment of a quartz tube in which the cross-sectional area has been expanded (e.g., using glass blowing techniques) to provide an enlarged volume. A source of microwave energy 10 is then applied (irradiated into) the reactor zone and in presence of the hydrocarbon and carrier gas that are being admitted into the reaction zone. The frequency and power of the microwave energy are adjusted to the point at which a microwave discharge plasma can be maintained, hydrocarbon bonds of the primary reactant may be broken, but polymerization of the hydrocarbon or its decomposition products or radicals does not occur.

After the microwave energy has been applied to the reaction zone containing the hydrocarbon and carrier, a microwave discharge plasma is initiated within the reaction zone. The plasma can be initiated by introducing a spark into the system.

After passing through the reaction zone containing the microwave discharge plasma, the hydrocarbon fluid is conducted through an outlet 11 in the reactor and is allowed to contact a catalyst 12 placed immediately downstream of the reactor.

After contacting the catalyst, reaction products formed by passage of the hydrocarbon and carrier through the microwave discharge plasma and catalyst, are collected downstream of the catalyst 12.

PRIMARY HYDROCARBON REACTANT

The hydrocarbon (primary) reactant used in the present process, may be any hydrocarbon having between 1 and 6 carbons. The hydrocarbon may be straight or branched chain; saturated or unsaturated; and may have optionally have a functional group. Representative examples include, methane, ethane, propane, n-butane, pentane, hexane, iso-butane, ethylene, propene, and mono-or di-butene, or mixtures thereof, such as natural gas. Among the hydrocarbons having functional groups the following are representative: haloalkanes; alcohols; ethers; thiols; alkenes; alkynes; aldehydes; ketones; carboxylic acids; anhydrides; esters; amides; nitriles; and amines.

Ideally, the hydrocarbon should be selected from those fully saturated hydrocarbons having between 1 and 4 carbons, i.e., methane, ethane, propane, iso-propane, iso-butane or n-butane. Methane is especially preferred as the primary reactant for use in the invention by virtue of its ready availability and low cost. These hydrocarbons are desirable as starting materials because they are all gaseous at standard temperature and pressure. It is important that the hydrocarbon be introduced to the reactor in the gas phase.

Other hydrocarbon materials may also be employed as primary reactants in the process of the invention, provided they are heated or subjected to reduced pressure before being introduced to the reactor, to ensure that only gas phase hydrocarbons are introduced to the reactor.

CARRIER

It is important, although not essential, to admix a carrier fluid with the hydrocarbon, before the hydrocarbon enters the reactor. The carrier should also enter the reactor in the gas phase. The properties of the carrier may affect the reaction conditions in the reactor. For some reactions, it may be desirable to employ an inert carrier gas to serve primarily as a diluent for the hydrocarbon and to provide alternate pathways for reaction by promoting collisions between gas phase species. Inert carrier gases that are useful in the present invention include noble gases such as helium, neon, krypton, xenon and argon.

It has been surprisingly discovered that oxygen, hydrogen and nitrogen may also be employed as carrier gases for a hydrocarbon, both for reactions where the carrier is to serve primarily as a diluent, and for reactions in which it is desired that the carrier react with the hydrocarbon to form, e.g., oxygenated hydrocarbons, such as formaldehyde. While not wishing to be bound by theory, it is believed that oxygen may serve to prevent coke formation, and may also scrub coke already formed on reactor walls or on catalyst surfaces by forming carbon monoxide or carbon dioxide from the carbon of the coke. For these reasons, oxygen is the preferred carrier gas. Nitrogen and hydrogen may operate in a similar manner and are also considered as being among the preferred diluent gases.

If desired, noble gas carrier species can be activated to create excited noble gas species upstream from the plasma zone. The high energy species are then introduced to the plasma at energy states higher than the ground state to generate radicals requiring high amounts of energy. The noble species can be activated upstream of the plasma zone using the emissions from ultraviolet photolamps, laser or plasma radiation, to excite the gas, prior to introduction of the excited gas species into the plasma zone of the reactor.

FLUID CONDITIONS

Before introduction of the primary hydrocarbon reactant and optional carrier fluids to the reactor, it may be desirable to alter their physical characteristics. As set forth above, it is important that both fluids be introduced into the reactor in the gaseous phase. Liquids can be vaporized to the gas phase by heating to the vaporization temperature or by lowering the ambient pressure sufficiently to cause vaporization of the liquid. Thus, the process of the present invention, can include the steps of heating or cooling the fluid starting materials to convert them to gaseous form or changing the pressure of the gases introduced to the reactor. It is preferred that the pressure of the gases be between about 3 and 760 torr.

It is highly desirable to thoroughly mix the carrier and hydrocarbon fluids prior to introduction of the fluids to the reactor. Admixture of the carrier and hydrocarbon fluids can be accomplished by having separate supply tubing lines for the hydrocarbon and carrier fluids meet at a "Y-tube", wherein the fluids are mixed and continue to flow in a single supply line towards the reactor inlet 7.

Another important variable in the reactor conditions is the flow rate at which the hydrocarbon and carrier gas are admitted into the reaction zone of the reactor. Because the mixture of hydrocarbon and carrier gas serves as fuel for the microwave discharge plasma, it is important to optimize the flow rate of these gases into the reactor to ensure that the plasma is maintained as efficiently as possible. For a cylindrical reactor of 12 mm outside diameter, served by a microwave power supply of 0.1 to 100 watts emitted at 2.45 GHz, suitable flow rates range from 0.1 to 1000 mL/min. Preferred flow rates range from 20 to 500 mL/min.

It is possible to calculate the relative rates of reaction for the cracking process of the present invention, in order to optimize the microwave power and other variables of the reaction.

Assuming a power of 60 watts supplied by the microwave generator, the volume of the microwave plasma generated is 1.508 cc. Thus, the power density is 60 watts/1.508 cc, or 39.79 watts/cc.

The following table is constructed based on data assembled from Examples 28-45.

TABLE 1

| P (torr) | Q (cc/sec) | % Conversion | V/Q (sec) | u (cm/sec) | Rate (sec$^{-1}$) |
|---|---|---|---|---|---|
| 10 | 50 | .38 | 1.81 | 1.66 | 0.223 |
| 20 | 100 | .17 | 0.91 | 3.32 | 0.188 |
| 50 | 500 | .04 | 0.18 | 16.6 | 0.221 |

Q = flow rate;
V = volume in cc;
u = linear velocity
u = Q/A
residence time = V/Q
rate = Q(% Conv.)/V It is observed that as the pressure increases, (more $CH_4$ reactant) the reaction rate remains relatively constant. It may then be inferred that the specific type of reactor is not an important variable, because the reaction rate doesn't depend on the instantaneous $CH_4$ concentration during passage through the plasma. Thus, whether a "plug flow" or "piston flow" reactor arrangement is used, where concentration of reactant varies with flow, or a continuously stirred tank reactor (CSTR) is used, where the concentration remains constant throughout the reactor, the shape of the reactor does not matter. Therefore, the critical factor to be considered is efficiency of transfer of microwave energy to the reactants. This efficiency may be quantified in terms of power density of the reactor. Power density is dependant upon microwave power and flow rate. In turn, flow rate is dependent upon the pressure and dimensions of the reactor.

REACTOR

The reactor employed in operating the microwave discharge process is an enclosed chamber or container having an inlet orifice and an outlet orifice. The reactor must be constructed of materials that are capable of containing a microwave discharge plasma, and the reactor walls must allow the passage of microwave energy to the interior of the reactor. The reactor should be airtight. Means for providing high voltage spark ignition within the reactor must be provided. The spark is used to initiate the plasma within the reactor and the spark supply device must be positioned to introduce a charge to the reaction zone of the reaction. The volume and shape of the reactor can be chosen to optimize reaction conditions for particular reactions. In one embodiment, the preferred reactor is constructed of tubular quartz. The laboratory scale reactor employed in Examples 2-45 herein has an outside diameter of 12 mm. However, larger size reactors may be constructed using the same materials. In one preferred embodiment, valves are provided for controlling the admission to, and exhaust from the reactor of the gaseous reactants and decomposition products.

MICROWAVE SOURCE

Any suitable device capable of generating microwave energy may be employed in practicing the cracking process of the invention. It is preferred that the generator emit microwaves at a frequency in the 2.45 GHz range and at a variable output power level of between about 0.1 and 100 watts, i.e., the microwave generator can be adjusted to an output power level of between about 0.1 and 100 watts. In one preferred embodiment, an output power level of 40 watts is employed. In general, the output power of the microwave generator is adjusted to provide the most efficient level of cracking, i.e., maximum production of decomposition reactants, at the lowest level of energy consumption. Care must also be taken to provide sufficient microwave energy to break the hydrocarbon bonds in the primary reactant, while avoiding polymerization of the decomposition products of the plasma discharge reaction. Generators emitting microwaves at other power levels and/or frequencies may be used, depending on reaction conditions. To focus the microwave energy on the interior of the reactor, a wave guide is employed.

Preferably, the quartz reactor is placed in close proximity to a Raytheon microwave ¼ wave Evenson-type cavity. The Evenson ¼ wave cavity directs the microwave energy emitted from the generator by guiding the energy to encircle the quartz reactor. The Evenson cavity is adjustable such that the microwave energy can be introduced locally to the plasma, and thereby used to control the volume of the plasma.

CATALYSTS

According to the present invention, it is possible to crack or activate hydrocarbons such as methane, for example, by breaking C-H bonds using the microwave plasma without a catalyst. However, the ability to control the reaction and produce specific desired end products is generally low in the absence of a catalyst. In other words, the selectivity associated with the reaction is usually low unless a catalyst is provided. Selection of an appropriate catalyst is essential, if high selectivity of the end product and good control of the reaction is to be obtained. However, as shown below, careful selection of reactants and reaction conditions can also result in high selectivity of end product.

The catalyst should be positioned downstream of the reaction zone. If the catalyst is placed within the plasma reaction zone there is a significant danger that the surface of the catalyst may become prematurely coked. It has been found that the best results are obtained by locating the catalyst just outside the zone in which the microwave plasma is created. The catalyst can be placed within the tubing carrying gases from the reactor outlet. Alternatively, and preferably, the catalyst may be placed within a U-tube downstream of the reactor outlet.

Selection of the catalyst is dependent somewhat on reactants and reaction conditions. Generally, a metal or metal oxide material is employed as the catalyst. If methane is used as the reactant gas, the catalyst must be a hydrogen acceptor if high selectivity towards ethane or ethylene is to be attained. For the production of olefins, it is necessary to use a catalyst that can adsorb hydrogen, such that unsaturated species will result. Typically, dehydrogenation catalysts such as nickel are used for this purpose.

Platinum catalysts are strong oxidizing catalysts. Large amounts of $CO_2$ are formed when Pt is used as a catalyst with the process of the present invention. At the same time, relatively large amounts of HCHO are formed. Conversely, nickel catalysts tend to minimize the formation of highly oxidized species and favor methanol production instead. Representative examples of catalysts which can be used in the present invention include: nickel, platinum, iron, nickel/iron, nickel/silica, nickel/yttrium, nickel/alumina, platinum/alumina, manganese oxide, manganese trioxide and molybdenum trioxide.

To be useful in the present invention, a catalyst should be resistant to coking under low power microwave reaction conditions, and should also be thermally and photochemically stable. Thermal stability refers to the ability of the catalyst to withstand the operating temperatures of the hydrocarbon cracking reactions carried out using the low power microwave energy conditions of the present invention.

In general, to be useful as a catalyst element in the instant process, a composition must withstand continuous long term exposure to temperatures up to about 500° C. Long term exposure refers to the intended duration of operation of the reactor vessel of the invention. It is contemplated that in commercial operation the microwave cracking process of the invention may be conducted continuously for several days, or more before the process is halted for cleaning the reaction vessel. The catalyst element of the invention should be non-volatile under operating conditions. A high catalyst surface area is desirable. A high surface area can be attained by providing the catalyst in a suitable shape or size, e.g. in finely divided powder form. In an alternative arrangement, the catalyst can take the form of a fine mesh screen or a sintered disc. In addition, the catalyst array may be disposed on one or more silica supports that are positioned in the reactant stream.

TRAP

Downstream of the catalyst, volatile reaction products may be collected or impurities removed according to methods known to the art. One such method includes providing a cold trap 14 of liquid nitrogen or dry ice. A liquid nitrogen trap operates by providing a reservoir of liquid nitrogen and the gaseous phase cracking reaction products are bubbled into the liquid nitrogen. The reaction products are liquified or solidified by the liquid nitrogen, trapping them within the liquid nitrogen. A vacuum source 16 is provided downstream of the trap.

The various parameters of the reaction process, such as temperature of the reactant gas, configuration of the reactor, the type of carrier gas, power level of the microwave energy source, pressure of the system, and type and physical configuration of the catalyst can be adjusted to selectively alter the compounds produced by the present process.

The present process makes it possible to achieve high selectivity, i.e., control over the end products created. Deleterious coking, associated with high power reactions, does not occur. Consequently, the process may be operated almost continuously, thereby avoiding the frequent, periodic removal of coke and other deposits from the reactor and catalyst, that are drawbacks of prior art processes.

An essential feature of the present invention is the maintenance of a microwave discharge plasma using very low energy levels. As used herein, a low energy plasma is one that is created using a microwave power source radiating at a frequency of 2.45 GHz at an emitted (radiated) power level of up to 100 watts.

Thus, it has been surprisingly discovered that a plasma formed of a primary reactant such as methane or a methane/oxygen plasma may be maintained using a microwave power source having a frequency of 2.45 GHz and an emitted power level of between 0.01 and 100 watts under standard experimental conditions.

A microwave plasma includes ions and electrons, neither of which may be evenly distributed depending on various factors, such as the type of cavity or the reactant. Thus, the plasma is not generally in thermodynamic equilibrium but, rather consists of a gradient of ions and electrons. In the present process, it is desirable to promote reaction conditions that favor the creation of radicals of the hydrocarbon reactant that can readily combine with other radicals that are present in the plasma zone or on the surface of the catalyst, in order to form new compounds that may be useful, e.g. as feedstocks in the manufacture of plastics. The present process is also useful in producing molecular hydrogen. Ionization of the desired hydrocarbon feedstock products is to be avoided because this may lead to concomitant cracking reactions, and the formation of polymerization and carbonaceous products of lower commercial value. Ionization and cracking processes occur in plasma reactions under high energy conditions which, therefore, are to be avoided. Thus, the input power to the microwave source should be optimized, usually at low power/energy consumption, to promote coupling reactions and to avoid cracking and ionization reactions.

The power density required to maintain the plasma is dependent on reactor dimensions, composition and flow rate of the gas stream and the gas stream pressure. Other factors which will influence power density include the presence or absence of a catalyst; the composition of the reactor; additives to the fuel stream; and temperature.

It has been determined experimentally, by the present inventors, that the low microwave power emissions found to be useful in the present process are sufficient to maintain a discharge plasma within a gas confined in a tubular quartz reactor having an outside diameter of 12 mm, and encircled by an Evenson quarter wave cavity to focus the microwave energy on the plasma, at reactant flow rates of less than 1000 mL/min, and internal pressures (within the reactor) of between 3 and 760 torr.

The energy requirements for the conversion of methane have been experimentally determined by the present inventors. Based on the data of Example 35, the following reaction is seen:

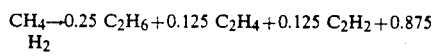

This reaction is balanced. The coefficients were determined from the data obtained from Examples 28–45.

The enthalpy of reaction ($\Delta H$) for this reaction is 21.166 kcal/mol of $CH_4$. The positive value means that this is an endothermic reaction which requires an input of heat to proceed.

From the enthalpy of reaction the actual energy in watts required for the reaction may be calculated:

For a 50 cc/min flow rate, at 60 watts supplied by the generator and a molar volume of 22.4 L/mol: (50 cc/min)/(60 sec/min (22,400cc/mol)=$3.72 \times 10^{-5}$ mol/sec and (21.166 kcal.mol $CH_4$)×4.184 J/cal=$8.856 \times 10^4$ J/mol then multiplying both together ($8.856 \times 10^4$ J/mol)×$3.72 \times 10^{-5}$ mol/sec=3.294 J/sec and 3.294 J/sec=3.294 watts.

Thus, of the 60 watts supplied by the generator, only 3.294 watts (based on the experimental mass balance) are needed to drive the reaction. Two conclusion may be drawn from this information. First, the reactor design is not very efficient, (3.294/60=5.5%), and second, the reaction is a low power process.

The flow rate, power and pressure of the reactor arrangement directly influence product selectivity. Selectivity may be explained by describing the sequence of H atom abstraction reactions which take place:

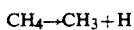 (1)

$$CH_3 \rightarrow CH_2 + H \quad (2)$$

$$CH_2 \rightarrow CH + H \quad (3)$$

$$CH \rightarrow C + H \quad (4)$$

and $$CH_4 \rightarrow CH_2 + 2H \quad (5)$$

$$CH_4 \rightarrow CH + 3H \quad (6)$$

$$CH_4 \rightarrow C + 4H \quad (7)$$

Reactions (1), (2) and (5) are desirable reactions for the production of ethane or ethylene from methane and in relation to the data set forth in the Examples must be low energy processes because they occur predominantly at low power levels in the microwave plasma. The selectivity in the present processes is optimized because reactions (3), (4), (6) and (7) have largely been minimized. These undesirable reactions can be minimized by either decreasing power, increasing the flow rate or by using a carrier. Examples exhibiting good selectivity by adjustment of the variables mentioned above, include those which employ a high flow rate (e.g., 500 ml/min) (Examples 30, 39-41, 43 and 44). In these Examples no acetylene ($C_2H_2$) was formed, suggesting that CH fragments are not formed when the flow rate is high.

It may be theorized that radical recombination must be the predominant method of product formation:

$$2 CH_3 \rightarrow C_2H_6 \quad (8)$$

$$2 CH_2 \rightarrow C_2H_4 \quad (9)$$

$$2 CH \rightarrow C_2H_2 \quad (10)$$

By preventing formation of CH, prevention of acetylene formation is also achieved.

The generalizations above appear to be accurate for the feeds used in the present Examples, methane and ethane. C-C bond breaking is not a concern for methane and was not observed for ethane. The data of the present Examples suggest the following microwave plasma reactions for ethane and ethylene:

$$C_2H_6 \rightarrow C_2H_4 + 2H \quad (11)$$

$$C_2H_4 \rightarrow C_2H_2 + 2H \quad (12)$$

The experimental data appears to show that reaction (12) requires more energy than reaction (11) and it may be implied that a methane feed may result in acetylene formation if the initial product—ethylene resides within the plasma for too long. This may account for the observation that an increased flow rate eliminates the production of acetylene. Thus, it appears desirable to remove produced ethylene from the plasma zone as quickly as possible.

It is well known that the relative energies of the radical species produced in reactions 1–12 can be influenced by the type of plasma (e.g., microwave, electrical discharge, glow discharge, etc.), and the type of carrier. The data obtained according to the present invention, suggest now that the power level of the plasma is also important in influencing relative energies of radical species.

To increase selectivity of desired products and decrease production of undesirable compounds, several factors must be optimized. These factors include: pressure, power, flow rate, and optionally carrier.

For carbon chain compounds such as butane ($C_4H_{10}$) C-C bond breaking is a concern because as the carbon chain length increases it becomes easier to break a C-C bond. One could anticipate the following reaction schemes:

$$C_4H_{10} \rightarrow 2 C_2H_5 \quad (13)$$

$$C_4H_{10} \rightarrow 2 C_2H_4 + 2 H \quad (14)$$

$$C_4H_{10} \rightarrow 2 C_2H_4 + 4 H \quad (15)$$

$$C_4H_{10} \rightarrow CH_3 + C_3H_7 \quad (16)$$

To increase selectivity of ethylene one would attempt to maximize the conversion of reaction (14) and minimize all of the others which favor final formation of acetylene, $C_2H_2$.

The discharge plasma can be initiated in a reaction zone using a spark from a Telsa coil or a static gun, or any other similar spark generating device. Maintenance of the plasma is easier if a carrier gas is introduced to the reactant gas stream.

A series of experiments was conducted to demonstrate the optimized efficiency levels and reaction selectivity conditions that may be attained with the low energy microwave reaction process of this invention.

EXAMPLE 1

Preferred Laboratory Reactor System Arrangement

A quartz reactor of 12 mm outside diameter was placed in close proximity (about 3 mm downstream) to a Raytheon microwave ¼ wave Evenson-type cavity, which was coupled to a 2.45 GHz microwave generator operating between 0.1 and 100 watts emitted power. The generator was adjusted to emit between 40 and 80 watts. The Evenson ¼ wave cavity was used to direct the microwave energy by encircling the quartz reactor, thereby creating a reaction zone. The Evenson cavity is adjustable such that the microwave energy can be focused on the plasma.

Copper tubing of ⅛" inside diameter fitted with brass and stainless steel vacuum fittings were used to supply the reactant gases and carrier gases to two arms of a 9 mm quartz, 120° Y-tube. ⅛" Swagelok fittings were used to join the copper lines to the Y-tube. The gases mix within the Y-tube and pass through the third arm, to be directed into the 12 mm quartz reactor. Immediately downstream (about 2-5 mm) of the reaction zone was located a quartz U-tube. In some experiments, the U-tube contained a solid catalyst. The catalyst was provided in finely divided form, of about 50 $m^2$/g in particle surface area.

Downstream of the U-tube, ⅜" quartz tubing was used to direct flow into a liquid nitrogen trap. Vacuum was applied to the downstream side of the trap.

The supply lines were equipped with flow meters and regulators, to regulate both the proportions of the reactant gas and carrier gas, and the flow rate.

A high voltage spark generator (Tesla coil) was used to initiate the plasma. As the spark impinges the quartz wall of the reactor, charges build up on the outside of the wall and charged particles flow through the quartz, and establish a charge on the inside surface of the quartz. The surface of the inside of the quartz tube then acts as an electrode, such that the gaseous species in the plasma ionize and are excited to excited state configurations.

The feed gases were scrubbed with zeolite molecular sieves to adsorb water before introduction to the reactor apparatus. Methane and inert gases were purified by passing the gas stream through a liquid nitrogen trap.

EXAMPLE 2

Using the apparatus described in Example 1 above, a microwave plasma reaction was conducted using methane as the hydrocarbon gas and oxygen gas as the carrier. Reactant gas flow was 53.2 mL/min. for methane and 24 mL/min. for oxygen. The gases were premixed before introduction to the reactor zone. A nickel powder catalyst having a surface area of 50 m$^2$/g was placed in the U-tube about 2-5 mm downstream of the reactor. The pressure of the system was maintained at 500 torr by applying a vacuum downstream of the liquid nitrogen trap. The microwave generator was set at a 40 watt power output setting (the emitted power was also confirmed by direct measurement). Measurement of reflected power showed that 36 watts were reflected; thus the reactor (and reactants) absorbed a total of 6 watts. In the present examples, power levels are set forth as power absorbed by the reactor and reactants, unless stated otherwise. The cavity present at the intersection of tubes in the Y-tube was air cooled. The reaction was conducted for 20 minutes.

21.5% of the methane introduced into the reaction zone was converted (cracked) into various reaction products. The reaction products were as follows: 67.4% ethane; 23.9% ethylene; 5.8% $CO_2$; and 2.9% propane.

Approximately 0.2 mL of liquid product was recovered in the liquid nitrogen trap. 90% of this liquid was water. The remaining liquid was a mixture of formaldehyde and methanol. The total amount of liquid hydrocarbon product was usually less than 5% of the total yield. For these reasons, only the ratio of formaldehyde to methanol is reported. The ratio of formaldehyde to methanol was 4.

EXAMPLE 3

The experiment of Example 2 was repeated with the following changes.

The catalyst used was 0.5% platinum by weight supported on alumina. System pressure was 3 torr. The system configuration was a cavity around catalyst (in U-tube). The microwave power emitted into the reaction chamber was 6 watts. In this arrangement, the plasma was confined to a small area.

2% of the methane was converted to selected reaction products. Of the reaction products selectivity was as follows: 10.5% ethane; 5.1% ethylene; and 33.2% $CO_2$. The ratio of formaldehyde to methanol was 11. The remaining product was coke —47.2%. The catalyst in this example turned black. Very high amounts of $CO_2$ were produced.

EXAMPLE 4

The experiment of Example 2 was repeated, but using a catalyst of 5% by weight of Ni (in powder form) supported on silica gel and the microwave power absorbed into the reactor was reduced to 2.4 watts. The ratio of ethane to ethylene was 0.2.

In this experiment the catalyst became coked. Conversion of methane was 2.4%. The reaction products of the process comprised 2.2% ethane; 12.6% ethylene; and 6% $CO_2$. The ratio of formaldehyde to methanol was 4.

EXAMPLE 5

The experiment of Example 4 was repeated without a catalyst, but with an absorbed microwave power of 7.5 watts and a pressure of 500 torr within the reactor. The reactor configuration was altered to locate the reaction cavity at the Y-tube. The reaction zone was not cooled.

37% of the methane gas introduced into the reactor was converted to various reaction products. Of the reaction products selectivity was as follows: 62% ethane; 25.9% ethylene; 4% propane; and 8.1% $CO_2$. The ratio of formaldehyde to methanol was 4.

EXAMPLE 6

The experiment of Example 5 was repeated, but the power absorbed into reactor was reduced to 6 watts. The reactor configuration was altered to position the reaction cavity at the Y-tube, in addition to a U-tube cooled with liquid nitrogen was provided.

8.9% of the methane introduced into the reactor was converted or cracked. The reaction products comprised 65% ethane; 17% ethylene; 2% propane; and 3.9% $CO_2$. The ratio of formaldehyde to methanol was 3.

EXAMPLE 7

The experiment of Example 6 was repeated, but using a NiY zeolite catalyst (in powder form). The reactor configuration included a catalyst in the U-tube and the reaction was conducted at the Y.

9.6% of the methane introduced into the reactor was converted to various reaction products. The reaction products comprised 73.3% ethane; 18.8% ethylene; 2.7% propane; and 5.2% $CO_2$. The ratio of formaldehyde to methanol was 2. During the reaction, the catalyst turned buff colored from a light green color prior to the reaction.

EXAMPLE 8

The experiment of Example 7 was repeated, but oxygen was replaced by argon gas flowing at the same rate (24 mL/min.). As a further modification, the methane gas was introduced through one arm of the Y-tube, and the argon gas through another. The catalyst was changed to finely divided Nickel powder having a surface area of 50 m$^2$/g.

37.0% of the methane was converted to various reaction products. The reaction products comprised 57.5% ethane; 18.8% ethylene; 6.0% propane; and 0% $CO_2$. No formaldehyde to methanol ratio was observed. A polymeric deposit of unknown identity formed on the catalyst and on the downstream side of the reaction tube.

EXAMPLE 9

The experiment of Example 8 was repeated, but argon gas was replaced by oxygen gas introduced at the same flow rate. The pressure within the reactor was increased to one atmosphere (760 torr). The catalyst was changed to a finely divided Nickel power on alumina. It was noted that a few particles of catalyst turned grey during initial plasma synthesis. Coke deposition on the catalyst was also observed.

5.4% of the methane gas introduced into the reaction chamber was converted to other products. Of the reaction products selectivity was as follows: 21.5% ethane;

5.4% ethylene; and 1.4% $CO_2$. The ratio of formaldehyde to methanol was 4.

EXAMPLE 10

The experiment of Example 9 was repeated, but the internal reactor pressure was reduced to 500 torr and no catalyst was used. The reactor configuration was altered and asbestos heating tape was wrapped around the arm of the Y-tube to heat the reactant gases to 250° C. prior to entry into the reactor zone.

Conversion of methane was 15.3%. Of the reaction products selectivity was as follows: 45.5% ethane; 12.3% ethylene; 1.5% propane; and 2.9% $CO_2$. The ratio of formaldehyde to methanol was 1. It was noted that heating the reactant gases made little difference in the selectivity of the products. Some deposition was formed on the internal reactor surface.

EXAMPLE 11

The experiment of Example 10 was repeated, but the pressure was increased to one atmosphere and a catalyst of 0.5% platinum by weight supported on alumina in the form of a powder was used. The reactor configuration was altered to provide a cooling stream of air in the reaction cavity at the Y-tube and a U-tube for the catalyst.

6.0% of the methane was converted to various reaction products. The reaction products comprised 68.0% ethane; 23.1% ethylene; 1.8% propane; and 4.7% $CO_2$. The ratio of formaldehyde to methanol was 2.

EXAMPLE 12

The experiment of Example 11 was repeated, but the Y-tube cavity was not cooled.

55.3% of the methane was converted to various reaction products. The reaction products comprised 53.6% ethane; 26.8% ethylene; 6.7% propane; and 13% $CO_2$. The ratio of formaldehyde to methanol was 6.

EXAMPLE 13

The experiment of Example 11 was repeated, but using a catalyst consisting of Ni powder having a surface area of about 50 $m^2/g$, activated in flowing $H_2$ at a rate of 30 mL/min. at 250° C. for 4 hr.

Methane conversion was 29.6%. Selectivity of the reaction products was 61.1% ethane; 29.6% ethylene; 3.7% propane; 1.8% propylene; and 3.7% $CO_2$. The ratio of formaldehyde to methanol was 3.

EXAMPLE 14

The experiment of Example 13 was repeated, but the flow rates of methane and oxygen were reduced by 50%. No catalyst was used. The reactor configuration was altered to locate the reaction cavity at the Y-tube.

Conversion of methane was 2.8%. Selectivity of the reaction products was 70% ethane; 7.9% ethylene; 2.5% propane; 2.5% propylene; and 14.8% $CO_2$. The ratio of formaldehyde to methanol was 2.

EXAMPLE 15

The procedure of Example 14 was repeated, but the flow rates of methane and oxygen were doubled (to 53.2 and 24 mL/min., respectively). Pressure within the reactor was reduced to 5 torr. A catalyst of 0.85 g Ni mixed with 0.15 g Fe was placed in the U-tube. The catalyst was pretreated with methane plasma to reduce the oxide surface where coking started. The pre-treatment was then stopped, the catalyst stirred and the reaction resumed. A thin polymer film formed on the catalyst.

Methane conversion was 14.4%. Selectivity of the reaction products selectivity was 58% ethane; 15% ethylene; 3.6% propane; and 4.3% $CO_2$. Formaldehyde and methanol were produced in negligible amounts.

EXAMPLE 16

The procedure of Example 15 was repeated, but the catalyst was changed to Ni powder. The reactor configuration was altered to position the reaction cavity at the Y-tube, and a U-tube heated to 175° C.

Methane conversion was 7.4%. Selectivity of the reaction products was 65% ethane; 15.8% ethylene; 3.9% propane; and 11.8% $CO_2$. The ratio of formaldehyde to methanol was 2. In this trial, somewhat more liquid product (about 1 mL) was obtained.

EXAMPLE 17

The procedure of Example 16 was repeated, but the reactor pressure was increased to 10 torr, no catalyst was used, and the U-tube was heated to 150° C.

Methane conversion was 3.5%. Selectivity of the reaction products selectivity was 67.5% ethane; 13.8% ethylene; 6.8% propane; and 9.5% $CO_2$. The ratio of formaldehyde to methanol was 3.

EXAMPLE 18

The procedure of Example 16 was repeated using a reactor pressure of 5 torr and a catalyst consisting of finely divided Fe powder (of about 100 $m^2/g$ surface area). The U-tube was not heated.

3.9% of the methane introduced into the reaction chamber was converted to various reaction products. Of the reaction products selectivity was as follows: 72.2% ethane; 20.1% ethylene; 2.8% propane; and 4.4% $CO_2$. The liquid produced in this experiment was not analyzed.

EXAMPLE 19

The procedure of Example 18 was repeated, but the flow rate of oxygen was increased to 48 mL/min., the pressure was increased to 10 torr, and a Ni powder catalyst was used.

Methane conversion was 41.6%. The reaction products comprised 63.8% ethane; 13.7% ethylene; 7.6% propane; and 0% $CO_2$. No liquid products were formed. Heavy coking turned the catalyst black.

EXAMPLE 20

The procedure of Example 19 was repeated, but the oxygen flow rate was reduced to 24 mL/min. Methane plasma was reacted over the catalyst before starting the microwave energy was turned on in order to reduce the oxide surface layer before the cracking reaction began. This pretreatment tends to produce a reducing environment to enable the reduction of the thin NiO surface layer to obtain a more highly reactive metallic nickel surface during reactions of methane and oxygen in the plasma.

Conversion of methane was 57.8%. Of the reaction products selectivity was as follows: 63.6% ethane; 25.2% ethylene; 7.7% propane; and 7.7% $CO_2$. The ratio of formaldehyde to methanol was 4.

EXAMPLE 21

The procedure of Example 20 was repeated, but the flow rates of methane and oxygen were reduced by 50%. No catalyst was used.

Methane conversion was 2.8%. The reaction products were 80.3% ethane; 7.2% ethylene; 0.2% propane; and 12.2% $CO_2$. No liquid product was obtained.

EXAMPLE 22

The procedure of Example 21 was repeated, but the flow rates of methane and oxygen were increased to 53.2 and 24 mL/min., respectively. The reactor was not cooled.

Methane conversion was 56.7%. Selectivity of the reaction products was 74.1% ethane; 20.8% ethylene; 3.1% propane; and 2.4% $CO_2$. The ratio of formaldehyde to methanol was 3.

EXAMPLE 23

The procedure of Example 22 was repeated, but the pressure was increased to 300 torr. Finely divided Manganese oxide powder covered by glass wool was used as a catalyst. The reactor configuration was altered to position the reaction cavity at the center of an inverted U-tube. The catalyst was positioned at the downstream bend in the U-tube.

Methane conversion was 7.4%. The reaction product selectivity was as follows: 67.6% ethane; 24.2% ethylene; 4.7% propane; and 2.2% $CO_2$. The ratio of formaldehyde to methanol was 7.

17.4% $CO_2$. The ratio of formaldehyde to methanol was 7.

EXAMPLE 25

The procedure of Example 24 was repeated, but the reactor configuration was changed to position the reaction cavity at the Y-tube. A U-tube was provided for the catalyst. Methane conversion was 5.2%. Selectivity of the reaction products was 76.9% ethane; 14.2% ethylene; 4.6% propane; and 3.2% $CO_2$. The ratio of formaldehyde to methanol was 8.

EXAMPLE 26

The procedure of Example 25 was repeated, but the catalyst was changed to $MoO_3$. The reactor configuration was altered to locate the reaction cavity at the entrance of the Y-tube, to increase the distance of the plasma reactor zone to the catalyst.

Methane conversion was 25.9%. The reaction products selectivity was as follows: 74.7% ethane; 13.2% ethylene; 6.2% propane; and 5.8% $CO_2$. The ratio of formaldehyde to methanol was 6.

EXAMPLE 27

The procedure of Example 26 was repeated, but the pressure was reduced to 200 torr. The reactor configuration was revised to provide the reaction cavity and the catalyst at the U-tube. At the initiation of the reaction, the catalyst immediately turned black.

The results of Examples 2-26 are tabulated in Table 1.

TABLE 1

| | Example | | | | | | | | | | | | | | |
|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 |
| Catalyst | Ni | Pt[a] | Ni | — | — | NiY $SiO_4$ | Ni | Ni[a] | — | Pt[a] | Pt[a] | Ni | — | Ni Fe |
| % Conv. | 22 | 2 | 2 | 37 | 9 | 10 | 37 | 5 | 15 | 6 | 55 | 30 | 3 | 14 |
| ethane | 67 | 11 | 2 | 62 | 65 | 73 | 58 | 22 | 46 | 68 | 54 | 61 | 70 | 58 |
| ethylene | 24 | 5 | 13 | 26 | 17 | 19 | 19 | 5 | 12 | 23 | 27 | 30 | 8 | 15 |
| $C_3$ compds | 3 | — | — | 4 | 2 | 3 | 6 | — | 2 | 2 | 7 | 6 | 3 | 4 |
| HCHO/ $CH_3OH$ | 4 | 11 | 4 | 4 | 3 | 2 | — | 4 | 1 | 2 | 6 | 3 | 2 | — |
| ethane/ ethylene | 3 | 2 | 0.2 | 2 | 4 | 4 | 3 | 4 | 4 | 3 | 2 | 2 | 9 | 4 |
| % $CO_2$ | 6 | 33 | 6 | 8 | 4 | 5 | — | 1 | 3 | 5 | 13 | 4 | 15 | 4 |
| comments* | | C | C | | | | P | | | | c | u | $H_2$ | F | C |

| | Example | | | | | | | | | | |
|---|---|---|---|---|---|---|---|---|---|---|---|
| | 16 | 17 | 18 | 19 | 20 | 21 | 22 | 23 | 24 | 25 | 26 |
| Catalyst | Ni | — | Fe | Ni | Ni | — | — | $MnO_2$ | $MnO_2$ | $MnO_3$ | $MoO_3$ |
| % Conv. | 7 | 4 | 4 | 42 | 58 | 3 | 57 | 7 | 3 | 5 | 26 |
| ethane | 65 | 68 | 72 | 64 | 64 | 80 | 74 | 68 | 77 | 77 | 75 |
| ethylene | 16 | 14 | 20 | 14 | 25 | 7 | 21 | 24 | 5 | 14 | 13 |
| $C_3$ compds | 4 | 7 | 3 | 8 | 8 | 0.2 | 3 | 5 | — | 5 | 6 |
| HCHO/ $CH_3OH$ | 2 | 3 | — | — | 4 | — | 3 | 7 | 7 | 8 | 6 |
| ethane/ ethylene | 4 | 5 | 4 | 5 | 3 | 11 | 4 | 3 | 15 | 5 | 6 |
| % $CO_2$ | 12 | 10 | 4 | — | 4 | 12 | 2 | 2 | 17 | 3 | 6 |
| comments* | L-H | H | | C | | c | u | | | | |

[a]These catalysts were placed on a $Al_2O_3$ support.
*C — coke; P — polymer deposit; c — cooled; u — uncooled; $H_2$ — $H_2$ reduced; F — ½ flow rate; L-H — more liquid, tube; H — heated.

EXAMPLE 24

The procedure of Example 23 was conducted, but the catalyst was positioned differently in the U-tube and a copper wire retainer was used to retain glass wool in place. The catalyst rested in place against the glass wool.

The methane conversion was 3.0%. The reaction products were as follows: 77.4% ethane; 5.2% ethylene;

Analysis of Experiments 1-27

In the experiments discussed above and below, analysis of products collected in the nitrogen trap as well as analysis of gas reactants, was conducted using gas chromatography. Two columns were connected in series to provide good separation of oxygenated products, reactants and air. The two chromatography columns used were Poropack Q and Poropack T. A thermal conductivity detector was used for these gas chromatography experiments.

Gas samples were manually syringed into the gas chromatography by sampling through a septum directly after the plasma zone so continuous operation could be maintained.

From the experimental results discussed above it is clear that if a catalyst is employed the catalyst material should not be positioned within the plasma zone (see for example, Examples 3, 4 and 7) because the surface of the catalyst is too active and causes carbon deposition, leading to poisoning of the catalyst and decreased selectivity. The catalyst should be positioned immediately downstream of the plasma zone to enable species created in the plasma to be cracked on the catalyst.

It is desirable to thoroughly mix the reactant gases prior to introduction into the plasma zone. In this way, the reactant gases are in close proximity for reaction after activation.

As a general rule, lower power levels result in lower conversion rates. Conversely, lower conversion rates usually mean higher selectivity. Therefore, power is a critical tradeoff which must be optimized for each desired product. For example, referring to Examples 5 and 6, when power was increased from 6 watts in Example 6 to 7.5 watts in Example 5, the % conversion increased (without a catalyst) as did selectivity towards ethylene.

Heating of the reactant gases prior to admitting them into the plasma zone or heating of the catalyst zone has a definite effect on selectivity. A comparison of Examples 21 and 22 shows that cooling the reaction with air blown over the outside of the tube (example 21) leads to a much lower overall conversion with respect to the non-cooled (example 22) run. In addition, when the tube is not cooled higher ethylene selectivity is obtained. In a comparison of examples 11 and 12 the same trend is observed, and a greater degree of oxidation of the methane for the uncooled system is obtained. Therefore, it appears that the overall reaction rate goes up as the temperature goes up, as is expected in catalytic reactions. It also appears that the level of oxidation is related to the temperature of the tube. As the temperature is increased, more totally oxidized (undesirable) products (such as $CO_2$) are formed. It is clear then that the temperature of the reaction should be optimized in order to control selectivity.

Coke deposition and carbonaceous deposits on the catalyst surface are minimized when oxygen is included in the gas feed. Reactions of methane using only argon as a carrier gas (without oxygen) lead to rapid coking of the catalyst. Thus, oxygen serves two functions: incorporation of O into oxidized hydrocarbon products; and protection against coke deposition.

Another series of experiments was conducted with the apparatus described in Example 1. For the following experiments no catalyst or carrier was present unless otherwise stated.

EXAMPLE 28

A mixture of methane (100 mL/min flow rate) and ethane 100 mL/min flow rate) with an overall flow rate of 100 mL/min was passed through the microwave plasma zone at a pressure of 27 torr. The power supplied by the generator was 80 watts. The reaction time was 20 min. A 4% conversion was obtained. No selectivity data were obtained.

EXAMPLE 29

A mixture of methane (50 mL/min flow rate) and ethane (50 mL/min flow rate) with an overall flow rate of 100 mL/min was passed through the microwave plasma zone at a pressure of 23 torr. The power supplied by the generator was 80 watts. A reaction time of 20 min was used. A 6 % conversion was obtained. No selectivity data were obtained.

EXAMPLE 30

A feed of methane, having a flow rate of 500 mL/min was passed through a microwave plasma zone at 50 torr pressure. The power supplied by the generator was 80 watts. A nickel powder catalyst was placed in the well of the quartz reactor tube downstream of the plasma zone. The reaction time was 20 min. An 8% conversion was obtained with 23.5% selectivity to ethylene and 76.5% selectivity to ethane.

EXAMPLE 31

A feed of methane, having a flow rate of 50 mL/min was passed through a microwave plasma zone at 10 torr pressure. The power supplied by the generator was 80 watts. A nickel power catalyst was placed in the well of the quartz reactor tube outside of the plasma zone. The reaction time was 20 min. A 31% conversion was obtained with 19.1% selectivity to ethylene, 33.7% selectivity to acetylene and 47.2% selectivity to ethane. A polymer was formed on the walls of the quartz tube beyond the plasma zone.

EXAMPLE 32

The reaction time of example 31 was extended to total of 40 minutes. A 31% conversion was obtained with 21.3% selectivity to ethylene, 37.0% selectivity to acetylene and 41.7% selectivity to ethane. A polymer was formed on the walls of the quartz tube beyond the plasma zone.

EXAMPLE 33

A feed of methane having a flow rate of 100 mL/min was passed through a microwave plasma zone at 23 torr pressure. The power supplied by the generator was 80 watts. The reaction time was 20 min. A 26% conversion was obtained with 25.3% selectivity to ethylene, 24% selectivity to acetylene and 50.7% selectivity to ethane.

EXAMPLE 34

A feed of methane having a flow rate of 50 mL/min was passed through a microwave plasma zone at 10 torr pressure. The power supplied by the generator was 80 watts. The reaction time was 20 min. A 31% conversion was obtained with 20.6% selectivity to ethylene, 38.4% to acetylene and 40% selectivity to ethane. Small amounts of polymer formed on reactor walls beyond the plasma zone.

EXAMPLE 35

A feed of methane having a flow rate of 50 mL/min was passed through a microwave plasma zone at 10 torr pressure. The power supplied by the generator was 60 watts. The reaction time was 20 min. A 38% conversion was obtained with 25% selectivity to ethylene, 25% selectivity to acetylene and 50% selectivity to ethane.

EXAMPLE 36

A feed of methane having a flow rate of 50 mL/min was passed through a microwave plasma zone at 10 torr pressure. The power supplied by the generator was 40 watts. The reaction time was 20 min. A 31% conversion was obtained with 23.1% selectivity to ethylene, 23.8% selectivity to acetylene and 53.1% selectivity to ethane. Some polymer formed on the reactor wall beyond the plasma zone.

EXAMPLE 37

A feed of ethane having a flow rate of 100 mL/min was passed through a microwave plasma zone at 23 torr pressure. The power supplied by the generator was 80 watts. The reaction time was 20 min. A 7% conversion was obtained with 100% selectivity to ethylene.

EXAMPLE 38

A feed of ethane having a flow rate of 50 mL/min was passed through a microwave plasma zone at 20 torr pressure. The power supplied by the generator was 80 watts. The reaction time was 20 min. A 10% conversion was obtained with 100% selectivity to ethylene.

EXAMPLE 39

A feed of methane, ($CH_4$), having a flow rate of 500 mL/min was passed through a microwave plasma zone at 40 torr pressure. The power supplied by the generator was 80 watts. The reaction time was 20 min. A 4% conversion was obtained with 24.9% selectivity to ethylene and a 75.1% selectivity to ethane.

EXAMPLE 40

A feed of methane having a flow rate of 500 mL/min was passed through a microwave plasma zone at 40 torr pressure. The power supplied by the generator was 60 watts. The reaction time was 20 min. A 4% conversion was obtained with 22.8% selectivity to ethylene and a 77.2% selectivity to ethane.

EXAMPLE 41

A feed of methane having a flow rate of 500 mL/min was passed through a microwave plasma zone at 50 torr pressure. The power supplied by the generator was 40 watts. The reaction time was 20 min. A 3% conversion was obtained with 25.1% selectivity to ethylene and a 74.9% selectivity to ethane.

EXAMPLE 42

A feed of ethylene, ($C_2H_4$), having a flow rate of 100 mL/min was passed through a microwave plasma zone at 23 torr pressure. The power supplied by the generator was 80 watts. The reaction time was 20 min. A 41% conversion was obtained with 100% selectivity to acetylene. A polymer was formed on the quartz reactor wall beyond the plasma zone.

EXAMPLE 43

A feed of methane, having a flow rate of 500 mL/min was passed through a microwave plasma zone at 50 torr pressure. The power supplied by the generator was 80 watts. A Pt gauze catalyst was placed in a well of the quartz reactor beyond the plasma zone. The reaction time was 20 min. A 6% conversion was obtained with 23.5% selectivity to ethylene and a 76.5% selectivity to ethane.

EXAMPLE 44

The reaction of example 30 was continued for a total time of 40 minutes with all other conditions remaining the same. An 8% conversion with a 27% selectivity to ethylene and a 73% selectivity to $C_2H_6$ was obtained.

EXAMPLE 45

A feed of ethane having a flow rate of 50 mL/min was passed through a microwave plasma zone at 20 torr pressure. The power supplied by the generator was 40 watts. The reaction time was 20 min. A 4% conversion was obtained with 100% selectivity to ethylene. Polymer formation was observed in the plasma zone.

The results of Examples 28–45 are tabulated in Table 2.

TABLE 2

| # | Feed | Catalyst | P | Power | Flow | Conv. | Select |
|---|------|----------|----|-------|------|-------|--------|
| 28 | C1/C2 | none | 27 | 80 | 200 | 4 | |
| 29 | C1/C2 | none | 23 | 80 | 100 | 6 | |
| 30 | C1 | Ni | 50 | 80 | 500 | 8 | $C2^=$,23.5 C2,76.5 |
| 31 | C1 | Ni | 10 | 80 | 50 | 31 | $C2^=$,19.1 acetylene, 33.7 C2,47.2 |
| 32 | C1 | Ni | 10 | 80 | 50 | 31 | $C2^=$,21.3 acetylene,37 C2,41.7 long reaction time |
| 33 | C1 | none | 23 | 80 | 100 | 26 | $C2^=$,25.3 acetylene,24 C2,50.7 |
| 34 | C1 | none | 10 | 80 | 50 | 31 | $C2^=$,20.6 acetylene,38.4 C2,40 |
| 35 | C1 | none | 10 | 60 | 50 | 38 | $C2^=$,25 acetylene,25 C2,50 |
| 36 | C1 | none | 10 | 40 | 50 | 31 | $C2^=$,23.1 acetylene,23.8 C2,53.1 |
| 37 | C2 | none | 23 | 80 | 100 | 7 | $C2^=$,100 |
| 38 | C2 | none | 20 | 80 | 50 | 10 | $C2^=$,100 |
| 39 | C1 | none | 40 | 80 | 500 | 4 | $C2^=$,24.9 $C2^=$,75.1 |

TABLE 2-continued

| # | Feed | Catalyst | P | Power | Flow | Conv. | Select |
|---|------|----------|-----|-------|------|-------|--------|
| 40 | C1 | none | 40 | 60 | 500 | 4 | C2=,22.8 |
| 41 | C1 | none | 50 | 40 | 500 | 3 | C2=,25.1 |
|    |    |      |    |    |     |   | C2,74.9 |
| 42 | C2= | none | 23 | 80 | 100 | 41 | 100 C2H2 |
| 43 | C1 | Pt | 50 | 80 | 500 | 6 | 23.5 C2H4 |
|    |    |    |    |    |     |   | 76.5 C2H6 |
| 44 | C1 | Ni | 50 | 80 | 500 | 8 | 27 C2H4 |
|    |    |    |    |    |     |   | long reaction time |
| 45 | C2 | none | 20 | 40 | 50 | 4 | 100 C2H4 |

Figure 2:
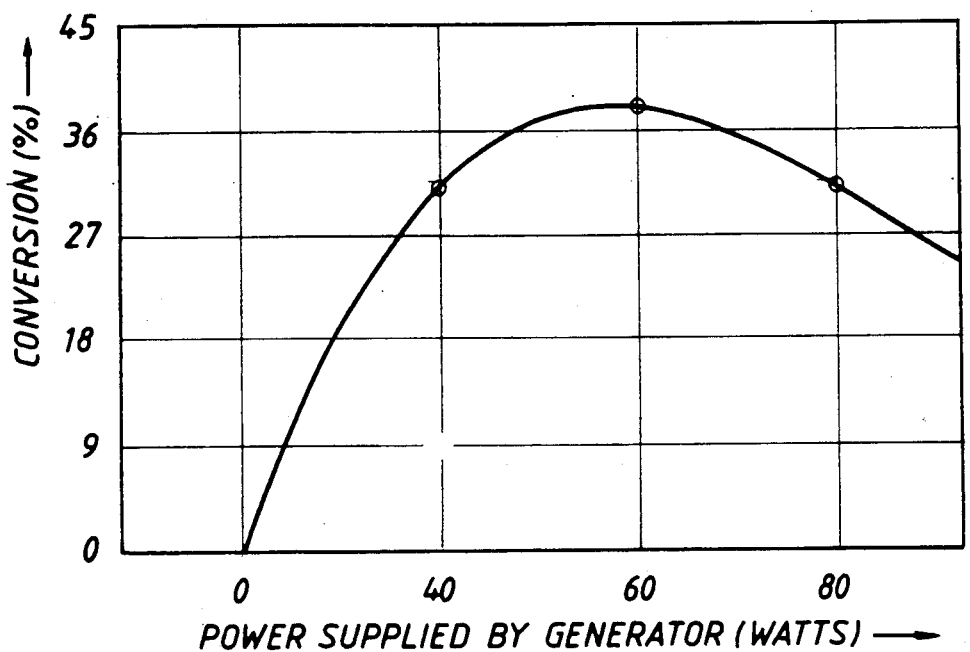

P in torr
Power in watts, power supplied by generator
Flow in mL/min
Conv. in %
Selectivity in %
C1 = methane, $CH_4$
C2 = ethane, $C_2H_6$
C2= = ethylene, $C_2H_4$ From the data in Table 2 a plot of % conversion versus power is constructed and shown in FIG. 2. This Figure shows that there is a maximum in conversion at an intermediate power (approximately 60 watts for the conversion of methane in the reactor arrangement of Example 1).

Figure 3:
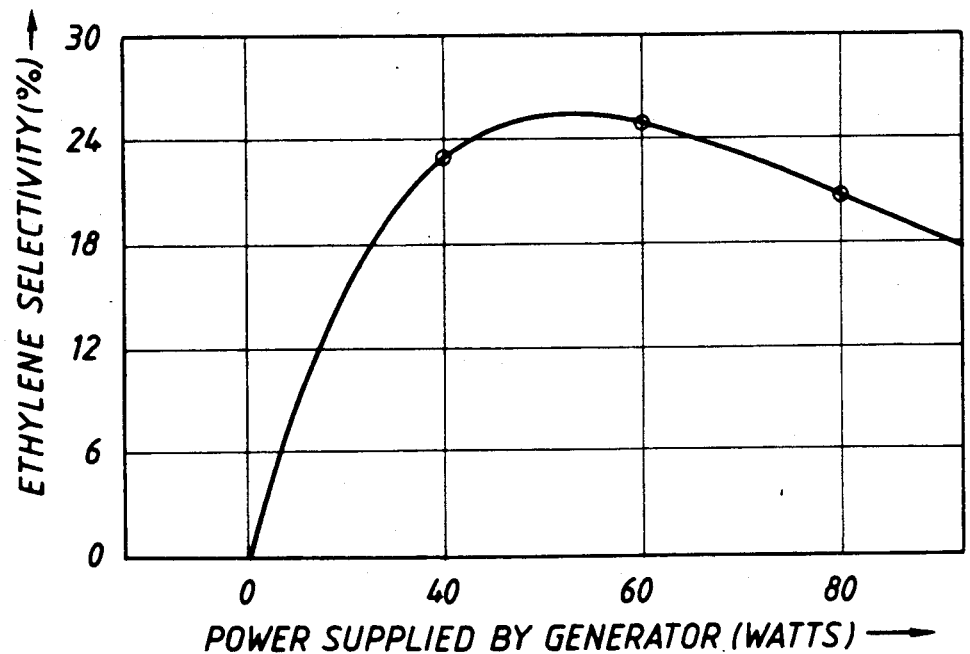

A similar relationship of selectivity for ethylene versus power is shown in the graph of FIG. 3.

Each of these Figures suggest that there is a way to optimize both selectivity and conversion in these reactions at an intermediate power. These are surprising observations which support the theory that selectivity and conversion may be controlled and thus optimized by controlling reaction conditions such as power, flow rate, and pressure.

Another feature of the present invention is the ability to recycle products or unreacted reactants emerging downstream of the reaction zone, back into the feed stream to be reacted further. Thus, if $CH_4$ is reacted and results in a yield of $C_2H_6$ (among other products), the $C_2H_6$ may be recycled back into the feed stream as a reactant. The present inventors have shown that when $C_2H_6$ is passed through the reaction zone, it converted to $C_2H_4$ with almost 100% selectivity. Thus, by using recycling, methane can be converted to ethylene with a high degree of selectivity.

What is claimed is:

1. A method for cracking a hydrocarbon to create cracked reaction products, which comprises:
   introducing a stream consisting of a hydrocarbon in fluid form into a reaction zone;
   exposing said reaction zone to a microwave energy to continuously maintain a low power density microwave discharge plasma within said reaction zone and in the presence of said hydrocarbon;
   determining concentrations of said cracked reaction products obtained downstream of said reaction zone;
   adjusting said microwave energy introduced to said reaction zone until the concentrations of said cracked reaction products cannot be increased by further adjustment of said energy; and
   collecting at least one of said cracked reaction products at a point located downstream of said reaction zone.

2. The method of claim 1 which further comprises conducting said hydrocarbon over a catalyst.

3. The method of claim 2 which comprises positioning said catalyst downstream of said reaction zone.

4. The method of claim 2 wherein said catalyst is a member selected from the group consisting of metals and metal oxide.

5. The method of claim 4 wherein said catalyst is a member selected from the group consisting of nickel, platinum, iron, nickel/iron, nickel/silica, nickel/yttrium, nickel/alumina, platinum/alumina, manganese oxide, manganese trioxide and molybdenum trioxide.

6. The method of claim 5 which further comprises locating said catalyst on a silica support.

7. The method of claim 1 wherein said hydrocarbon is selected from the group consisting of straight and branched chain hydrocarbons having between one and six carbon atoms.

8. The method of claim 1 wherein said hydrocarbon is heated prior to introduction to said reaction zone.

9. The method of claim 1 which further comprises collecting said cracked reaction products downstream of said reaction zone in a liquid nitrogen trap.

10. The method of claim 1 wherein said fluid hydrocarbon is a member selected from the group consisting of methane, ethane, ethylene, propane, propylene, butane, butene, pentane, pentene, hexane and hexene.

11. The method of claim 1 which comprises initiating said microwave discharge by application of microwave energy through said reaction zone at a frequency of about 2.45 gigahertz.

12. The method of claim 1 wherein said hydrocarbon fluid is admitted into said reaction zone at a flow rate of between 10 and 500 milliliters of fluid per minute.

13. The method of claim 1 wherein the pressure of said reaction zone is maintained at a pressure of between about 3 and about 760 torr.

14. The method of claim 1 which further comprises irradiating into said reaction zone sufficient microwave energy to break the chemical bonds of said fluid hydrocarbon, but less than the quantity of energy required to polymerize said fluid hydrocarbon.

15. A method for cracking a hydrocarbon into cracked reaction products, which comprises:
   conducting a fluid stream containing said hydrocarbon into a reaction zone;
   applying sufficient microwave energy at a frequency in a range of about 2.45 gigahertz to continuously maintain a lower power density microwave discharge plasma within said reaction zone in the presence of said hydrocarbon, said energy being sufficient to break the bonds of said hydrocarbon, but insufficient to polymerize said hydrocarbon or decomposition products or radicals of said hydrocarbon;

determining the concentration of said cracked reaction products obtained downstream of said reaction zone;

adjusting said microwave energy introduced to said reaction zone until the concentration of said cracked reaction products cannot be increased by further adjustment of said microwave energy; and collecting one or more of said cracked reaction products of said microwave discharge plasma downstream of said reaction zone.

* * * * *